(12) United States Patent
DaSilveira

(10) Patent No.: US 10,827,721 B1
(45) Date of Patent: Nov. 10, 2020

(54) STAGGERED AND INTERLOCKING CATTLE FREESTALL ASSEMBLY

(71) Applicant: John DaSilveira, Madisonville, TX (US)

(72) Inventor: John DaSilveira, Madisonville, TX (US)

(73) Assignee: John DaSilveira, Madisonville, TX (US)

( * ) Notice: Subject to any disclaimer, the term of this patent is extended or adjusted under 35 U.S.C. 154(b) by 0 days.

(21) Appl. No.: 16/858,517

(22) Filed: Apr. 24, 2020

(51) Int. Cl.
*A01K 1/00* (2006.01)

(52) U.S. Cl.
CPC .................. *A01K 1/0011* (2013.01)

(58) Field of Classification Search
CPC ........................ A01K 1/0005; A01K 1/0011
See application file for complete search history.

(56) References Cited

U.S. PATENT DOCUMENTS

| | | | | |
|---|---|---|---|---|
| 3,767,167 A | * | 10/1973 | Rasmussen | A01K 1/0005 256/26 |
| 3,810,442 A | * | 5/1974 | Jacobs | A01K 1/12 119/14.03 |
| 3,986,481 A | * | 10/1976 | Gloggler | A01K 1/0011 119/523 |
| 4,362,127 A | * | 12/1982 | Nielsen | A01K 1/12 119/14.03 |
| 4,508,059 A | * | 4/1985 | Anderson | A01K 1/12 119/14.03 |
| 4,805,558 A | * | 2/1989 | Lehmann | A01K 15/028 119/161 |
| 6,026,766 A | * | 2/2000 | Albers, Jr. | A01K 1/0011 119/520 |
| 2011/0103888 A1 | * | 5/2011 | Finn | A01K 1/0011 403/385 |
| 2017/0280670 A1 | * | 10/2017 | Johanningmeier | B05C 9/10 |

* cited by examiner

*Primary Examiner* — Monica L Barlow
(74) *Attorney, Agent, or Firm* — Crain, Caton and James

(57) ABSTRACT

Apparatus and methods to provide stalls for livestock such as dairy cattle and the like. A staggered/interlocking freestall assembly, which promotes better airflow and utilizes a smaller footprint that conventional freestall designs, is provided by using a plurality of uprights to create staggered and interlocking stalls.

10 Claims, 7 Drawing Sheets

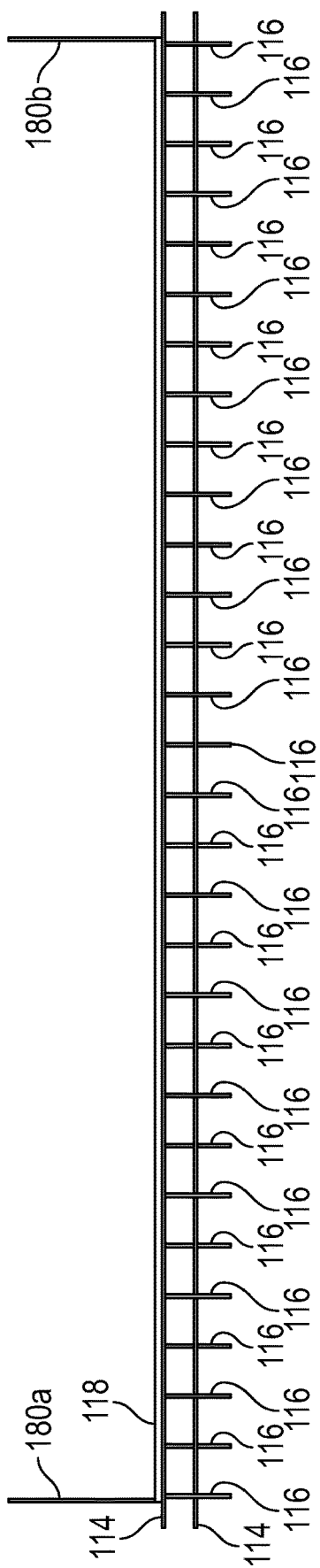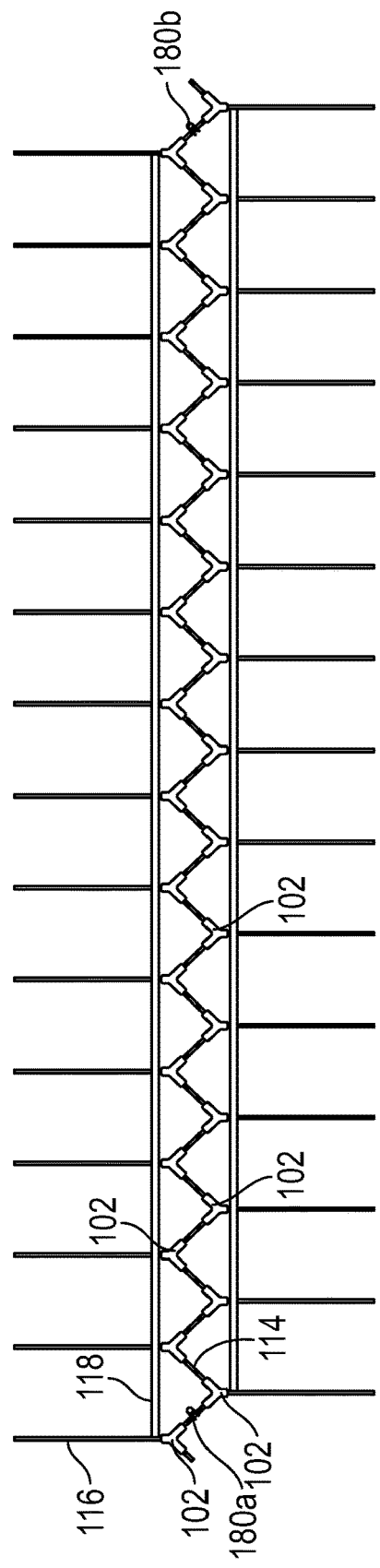

STAGGERED AND INTERLOCKING CATTLE FREESTALL ASSEMBLY

CROSS-REFERENCE TO RELATED APPLICATIONS

None.

FIELD OF THE DISCLOSURE

The following disclosure relates generally to livestock equipment, and more specifically to devices utilized to construct stalls for livestock such as dairy cattle and the like. More particularly, the following disclosure relates to a staggered/interlocking freestall assembly, which promotes better airflow and utilizes a smaller footprint that conventional freestall designs.

BACKGROUND

Livestock industries often provide separate stalls for individual animals to establish proper and safe spacing between the animals. The stalls are typically defined by divider walls or other types of projections extending from a longitudinally-running support frame or rail. The divider walls are fixed in relationship to a support frame to establish stall width at desirable dimensions. Unfortunately, space is wasted in such designs because the resulting stall is rectangular. It would be an advantage to provide a freestall assembly which promotes better airflow and utilizes a smaller footprint without wasted space.

BRIEF DESCRIPTION OF THE DRAWINGS

The detailed description is described with reference to the accompanying drawings, in which like elements are referenced with like reference numbers, and in which:

FIG. 4 illustrates a side view of the present disclosure with a twenty-eight stalls and fourteen stalls per side.

FIG. 5 illustrates a top view of the stalls of FIG. 4.

DETAILED DESCRIPTION OF THE ILLUSTRATIVE EMBODIMENTS

Figure 1:
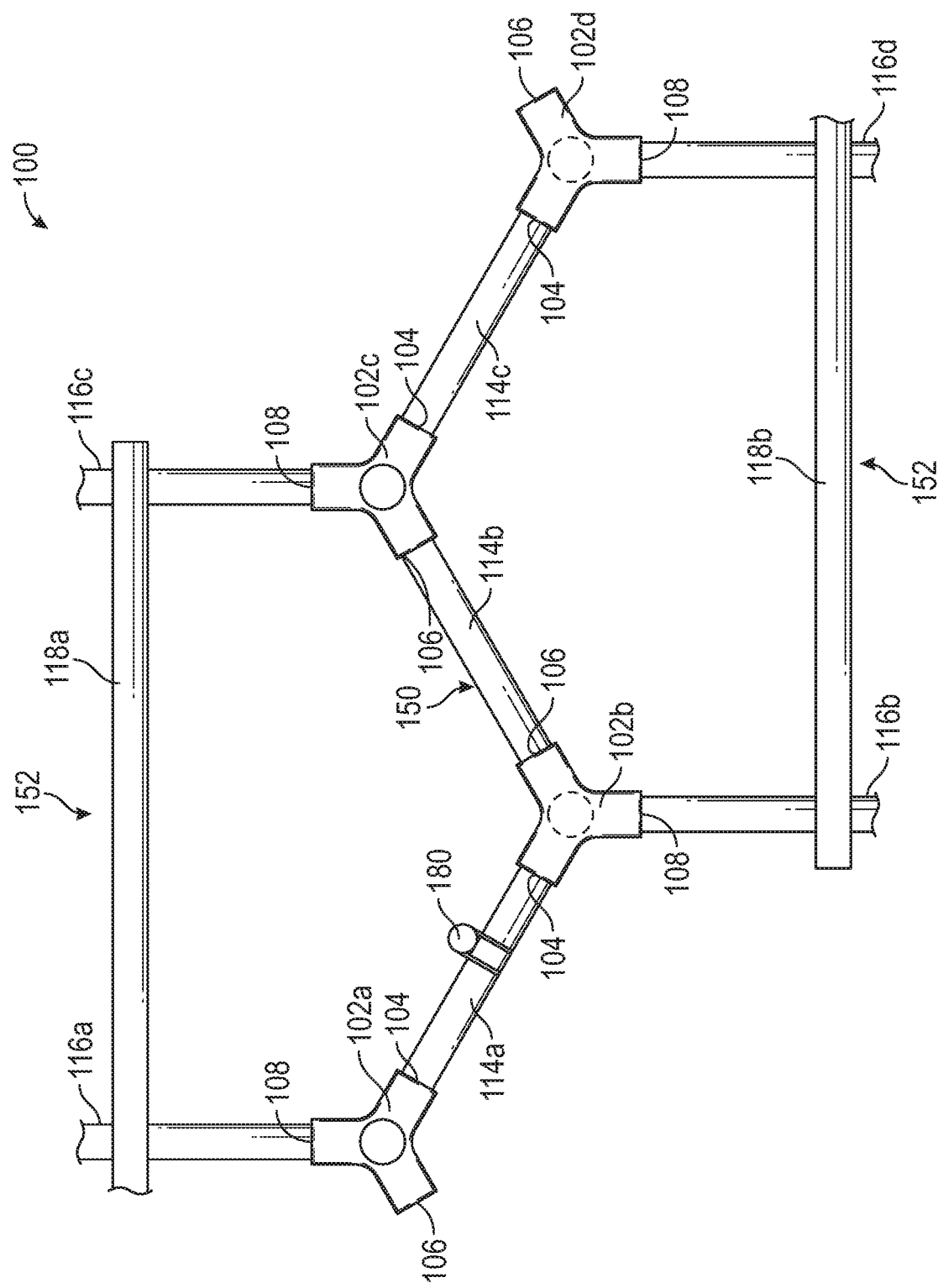
FIG. 1 illustrates a top-down view of the present disclosure where only two stalls are provided.

The subject matter disclosed herein is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will thus, be or become apparent to one of ordinary skill in the art upon examination of the following figures and detailed description. It is intended that all such features and advantages be included within the scope of the disclosed embodiments. Further, the illustrated figures are only exemplary and are not intended to assert or imply any limitation with regard to the environment, architecture, design, or process in which different embodiments may be implemented. The embodiments disclosed herein thus, may be used to provide stalls for livestock.

The apparatus and methods disclosed herein overcome one or more of the prior art disadvantages associated with livestock stalls by using a freestall assembly which promotes better airflow and utilizes a smaller footprint without wasted space.

In one embodiment, the close-packing livestock freestall assembly includes a plurality of stalls separated by a divider with a plurality of vertices, each stall having a plurality of parallel walls, wherein each wall is jointed to a respective vertex.

In another embodiment, the close-packing livestock stall includes a first connector body, a second connector body, a third connector body, and a fourth connector body, a first connector member, a second connector member, a third connector member, a first upright member, a second upright member, four stall dividers, and two neck rails, where each stall divider is attached to and supported fully by one of the four connector bodies.

In yet another embodiment, a method for construction of a close-packing livestock freestall assembly is provided which includes positioning a first upright member in fixed vertical position, affixing an upright member upper section of the first upright member to a joist, providing a plurality of connector bodies, providing a second upright member, a third upright member, and a fourth upright member, affixing one of the plurality of connector bodies to each of the first upright member, the second upright member, the third upright member and the fourth upright member, affixing a first connector member to the first connectors of opposing connector bodies, affixing a second connector member to the second connectors of opposing connector bodies, affixing a third connector member to the first connectors of opposing connector bodies, affixing a fourth connector member to the second connectors of opposing connector bodies, affixing a stall divider to each connector body at the connector body third connector, affixing a first neck rail to each stall divider on a first side of the first upright member adjacent one of the plurality of first connector bodies, and affixing a second neck rail to each stall divider on a first side of the third upright member adjacent one of the plurality of the first connector bodies. Each of the connector bodies has a connector body first connector, a connector body second connector, a connector body third connector, and a connector body fourth connector, where the connector body fourth connector is downwardly directed, and where each of the connector body first connector, the connector body second connector, and the connector body third connector are perpendicular to the connector body fourth connector and extend away from the connector body fourth connector.

Figure 2:
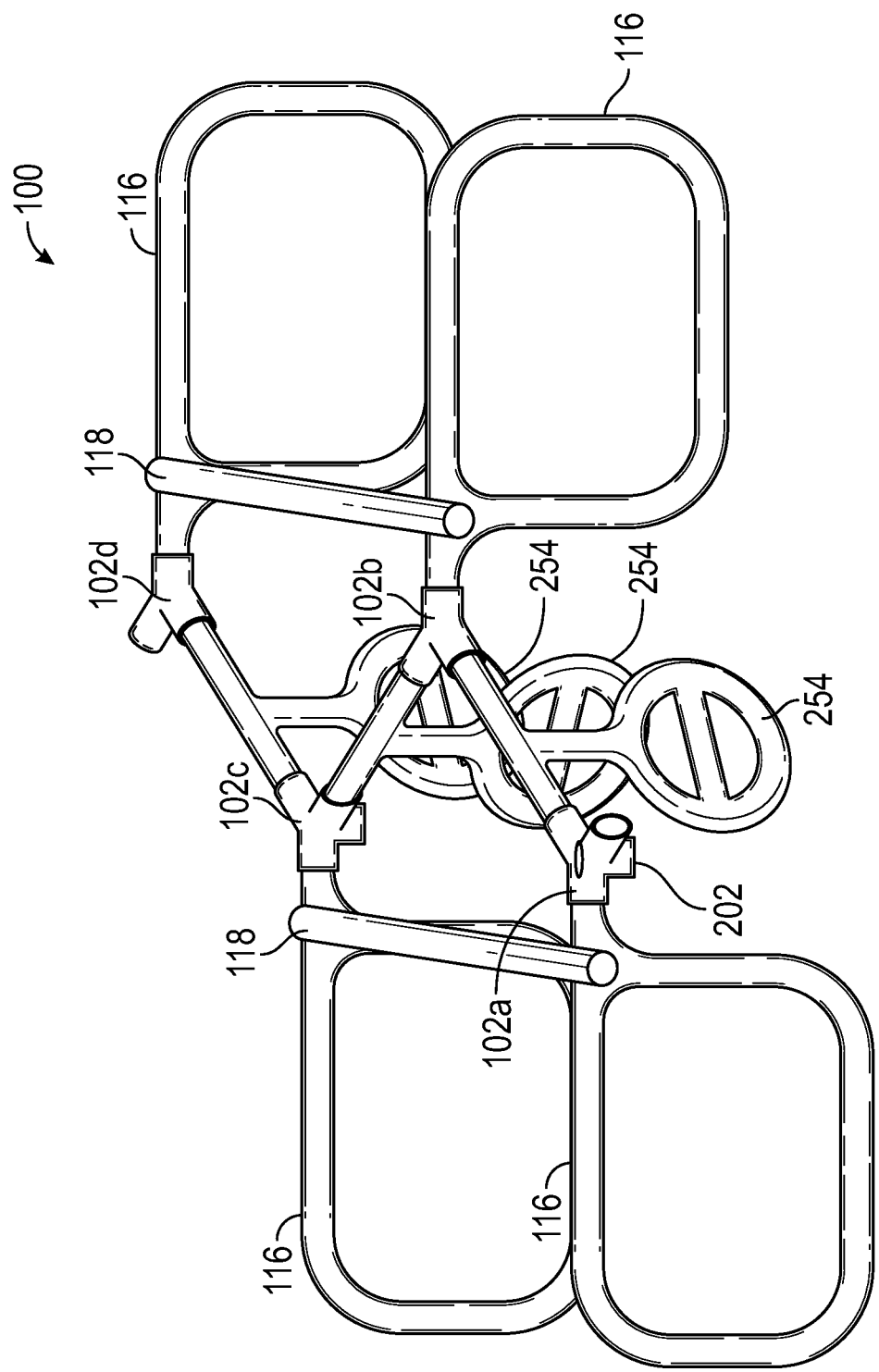
FIG. 2 illustrates a construction of the present disclosure.
Figure 6:
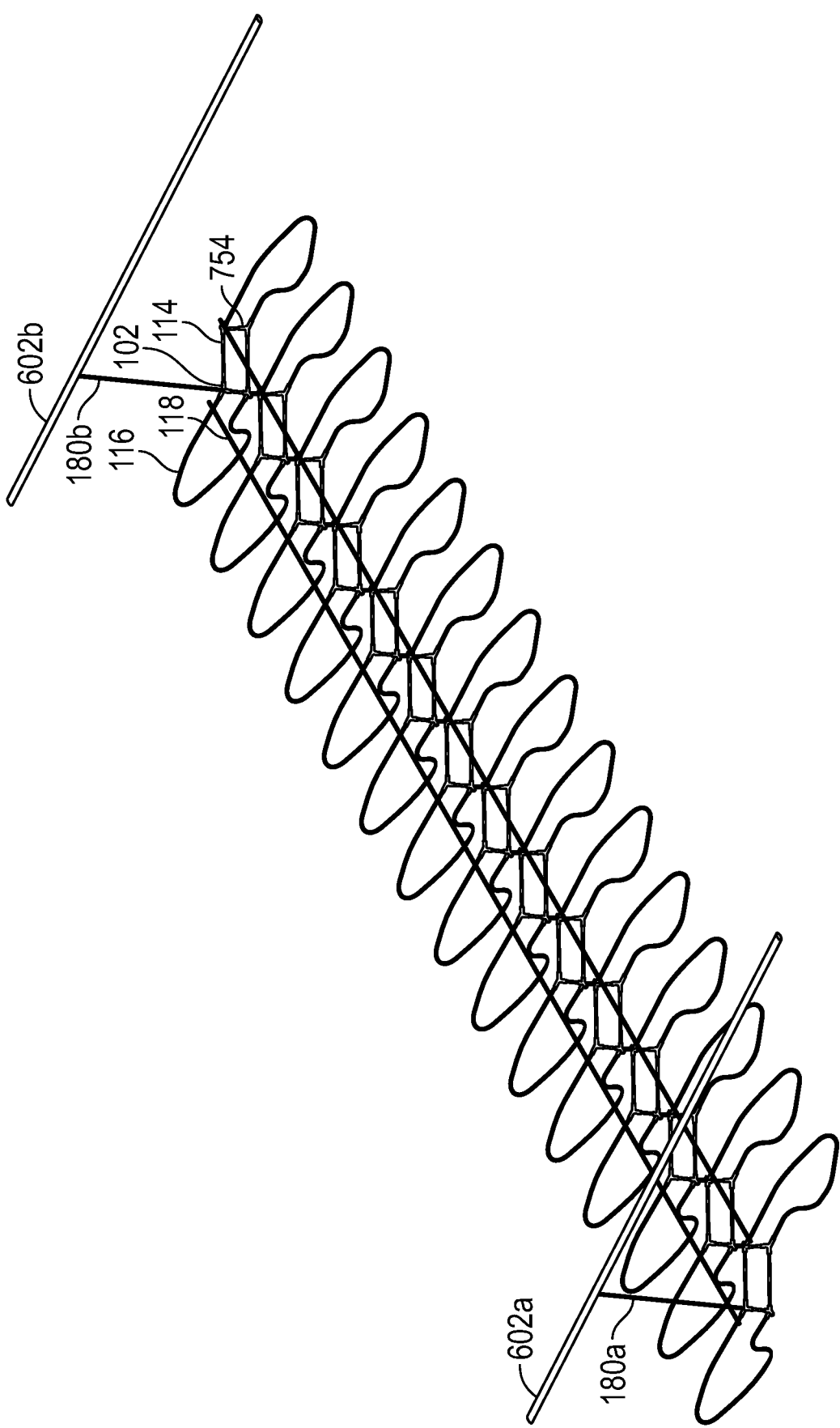
FIG. 6 illustrates an isometric view of the stalls of FIG. 4.
Figure 7:
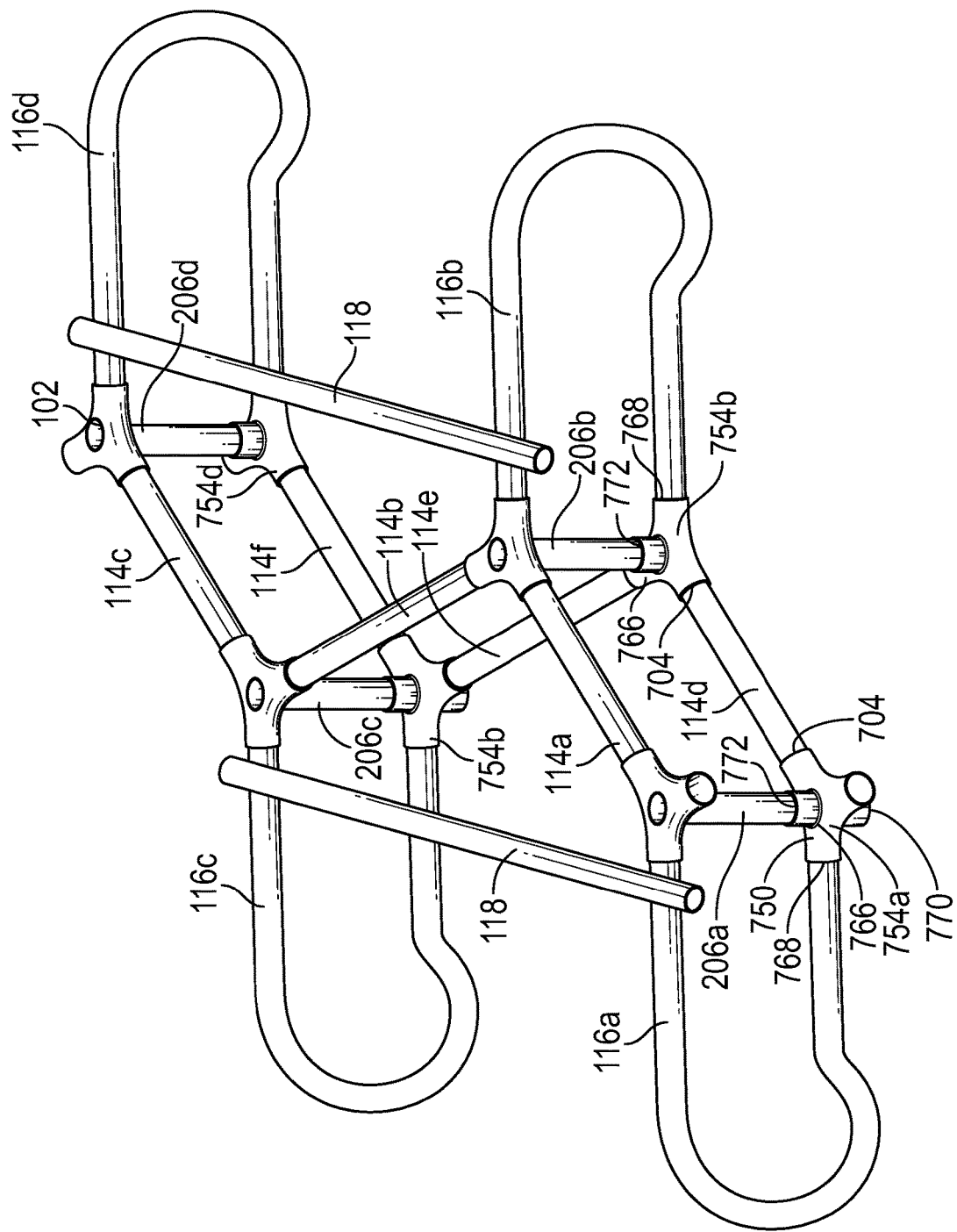
FIG. 7 illustrates a detail of the isometric view of the stalls of FIG. 6.

Referring to FIG. 1, an illustration of a top-down view of the present disclosure of two stalls is provided. The close-packing livestock freestall assembly 100 includes a plurality of stalls 152 separated by a divider 150 with a plurality of vertices, each stall 152 having a plurality of parallel stall divider 116, or other walls, wherein each stall divider 116 is jointed to a respective vertex. Referring to FIGS. 1, 2, and 6, four stall dividers 116 may be positioned to define two stalls 152. The four stall dividers 116 include a first stall divider 116a, a second stall divider 116b, a third stall divider 116c and a fourth stall divider 116d. The freestall assembly 100 is supported by one or more vertical supports 180, which may include a first vertical support 180a and a second vertical support 180b. The first vertical support 180a may be any vertical support present or may be one particularly positioned for support. The first vertical support 180a may therefore be selected from the group of supports including a first vertical building support, a first permanent vertical support affixed to a ground, and a first temporary vertical support resting on the ground. The second vertical support 180b may also be any vertical support present or may be one particularly positioned for support. The second vertical support 180b may be selected from the group of supports including a second vertical building support, a first permanent vertical support affixed to the ground, and a second temporary vertical support resting on the ground. When the first vertical support 180a and the second vertical support 180b are building supports, the freestall assembly 100 may be connected to an overhead joist 602a and the ground.

As illustrated in FIGS. 4, 5 and 6, thirty stall dividers 116 define twenty-eight stalls 152. Beneficially, the freestall assembly 100 can be attached to the first vertical support 180a and the second vertical support 180b so the freestall assembly 100 is centered along the line between the first vertical support 180a and the second vertical support 180b.

The close-packing livestock freestall assembly 100 may be constructed using as few as four connector bodies 102, particularly a first connector body 102a, a second connector body 102b, a third connector body 102c and a fourth connector 102d, though more may be used, as illustrated in FIGS. 4, 5, and 6. Referring to FIG. 2, an illustration of a construction of the present disclosure is provided. The close-packing livestock freestall assembly 100 includes the first connector body 102a, the second connector body 102b, the third connector body 102c and the fourth connector 102d, three connector members 114, including a first connector member 114a, a second connector member 114b, and a third connector member 114c with each of the connector members 114 attached to two of the four connector bodies 102, four upright members 206 each connected to a connector body 102, four stall dividers 116 each connected one of the four connector bodies 102 and two neck rails 118 each attached to two adjacent stall dividers 116. Because the three connector members 114, together with the stall dividers 116 define the individual stalls 152, each connector member 114 may further include a wide body 254 positioned at a location above, at a location below, or at a location about the top surface of each connector member 114, such as a downwardly attached loop with an internal divider so as to avoid square edges which may damage the livestock while preventing the loop from becoming an opening which may trap livestock heads or legs while limiting weight. The wide body 254 therefore includes an open loop with a bar through the opening.

Each of the first connector body 102a, the second connector body 102b, the third connector body 102c, and the fourth connector body 102d has a body first connector 104, a connector body second connector 106, and a connector body third connector 108. The orientation of these connectors facilities the positioning of the stalls.

Maximum usage of space is achieved when the relationship between the horizontal connector body connectors 104, 106, 108 is at 120 degrees, but other angles may be used to account for larger or smaller livestock. Because the connectors can be used in a first orientation and at 180 degrees to the first orientation, the angles of the connectors, while providing symmetry, can be selected based on need. Preferably, the connector body first connector 104 and the connector body second connector 106 are positioned at a 120 degree angle to one another, with the connector body first connector 104 and the connector body third connector 108 positioned at a 120 degree angle, and the connector body second connector 106 and the connector body third connector 108 positioned at a 120 degree angle.

Figure 3:
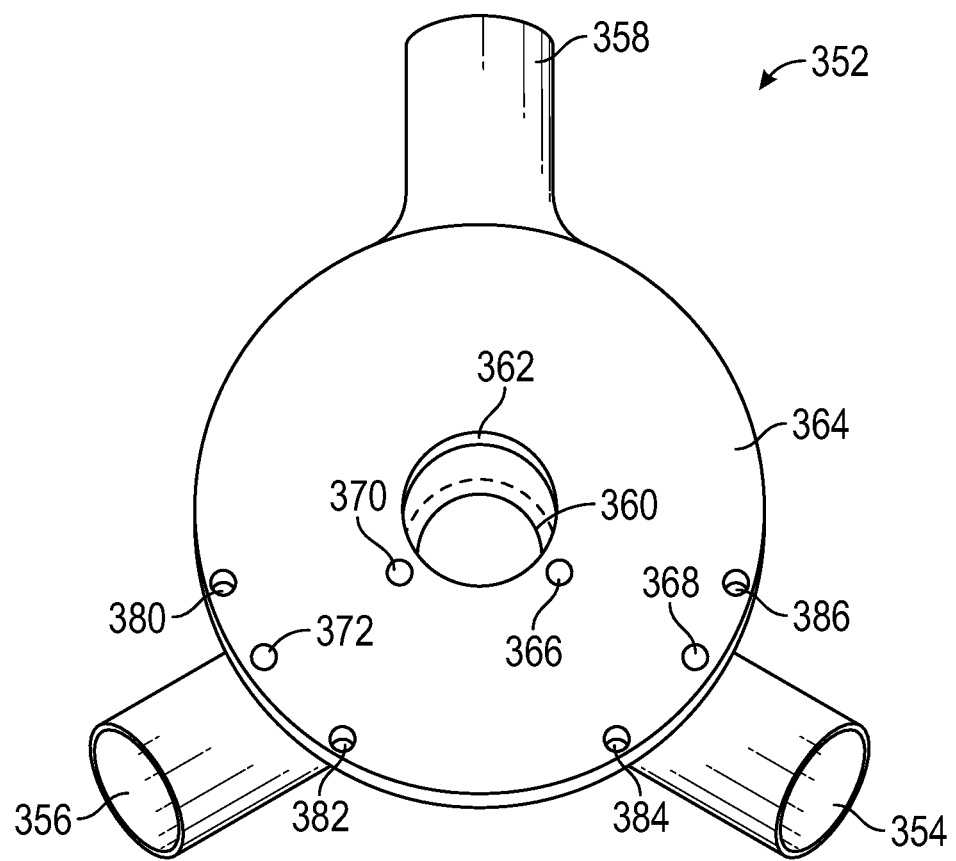
FIG. 3 illustrates a top view of an adjustable connector body of the present disclosure.

Referring to FIG. 3, a top view of an adjustable connector body 352 of the present disclosure is provided. The adjustable connector body 352 includes an adjustable connector body first connector 354, an adjustable connector body second connector 356, an adjustable connector body third connector 358, an adjustable connector body fourth connector 360 at its underside, and an adjustable connector body fifth connector 362 on its top which is vertically aligned and aligned with the adjustable connector body fourth connector 360 and an adjustable connector body center member 364. The adjustable connector body third connector 358 is fixed in relation to the adjustable connector body center member 364 and provides the point of connection to the stall divider 116 at the stall divider's top and bottom. The adjustable connector body first connector 354 is pivotally connected to the adjustable connector body center member 364 at a first end with a first connector pivot pin 366 and extends past the adjustable connector body center member 364. A first connector second pin 368 is detachably connected to the adjustable connector body center member 364 at a desired position to obtain the desired angle in relation to the adjustable connector body third connector 358 at an angle greater than 90 degrees relative to the connector body third connector 108. Likewise, to provide symmetry, the adjustable connector body second connector 356 is pivotally connected to the adjustable connector body center member 364 at a first end with a second connector pivot pin 370 and extends past the adjustable connector body center member 364. A second connector second pin 372 is detachably connected to the adjustable connector body center member 364 at a desired position to obtain the desired angle in relation to the adjustable connector body third connector 358 at an angle greater than 90 degrees relative to the connector body third connector 108. When desired, the relationship of the adjustable connector body first connector 354 and the adjustable connector body second connector 356 can be altered by moving the position of the first connector second pin 368 and the second connector second pin 372, respectively, to a different mounting hole 380, 382, 384, 386. The relationship can therefore the altered to decrease the angle to the adjustable connector body third connector 358 and thus widen the distance between the stall dividers 116, while reducing the number of stalls 152 per unit distance, or to increase the angle to the adjustable connector body third connector 358 and thus narrow the distance between the stall dividers 116, while increasing the number of stalls 152 per unit distance. Thus, the connector body third connector 108 is fixedly positioned to a connector body center member 364, the connector body first connector 104 is pivotally affixed to the connector body center member 364 and adapted to be fixed in one of a plurality of positions relative to the connector body center member 364, and the connector body second connector 106 is pivotally affixed to the connector body center member 364 and adapted to be fixed in one of a plurality of positions relative to the connector body center member 364.

Thus, connector body third connector 108 is fixedly positioned to a connector body center member 364, the connector body first connector 104 is pivotally affixed to the connector body center member 364 and adapted to be fixed in one of a plurality of positions relative to the connector body center member 364 at an angle greater than 90 degrees relative to the connector body third connector 108, and the connector body second connector 106 is pivotally affixed to the connector body center member 364 and adapted to be fixed in one of a plurality of positions relative to the connector body center member 364 at an angle greater than 90 degrees relative to the connector body third connector 108.

Referring to FIG. 1, intermediate the connector bodies 102 are connector members 114 which provide the structure of the close-packing livestock freestall assembly 100. Three connector members 114 provide two staggered, interlocking stalls 152 and define the divider 150. The three connector members 114 include a first connector member 114a, a second connector member 114b, and a third connector member 114c. Each connector member 114 may be a tube of metal, plastic, or other durable material. When assembled, the first connector member 114a is attached to a connector body first connector 104 of the first connector body 102a and to a connector body first connector 104 of the second connector body 102b. The second connector member 114b is attached to a connector body second connector 106 of the second connector body 102b and to a connector body second connector 106 of the third connector body 102c. The third connector member 114c is attached to a connector body first connector 104 of the third connector body 102c and to a connector body first connector 104 of the fourth connector body 102d. Attachment of a connector member 114 to a connector body 102 may be by a coupling device or may be provided where the connector member 114 directly couples to the connector body 102 by the connector member sliding into a sleeve in the connector body 102.

Referring to FIGS. 2 and 6, the close-packing livestock freestall assembly 100 is supported by upright members 206. In a two stall staggered structure, four upright members 206 are used. The four upright members 206 include a first upright member 206a, a second upright member 206b, a third upright member 206c, and a fourth upright member 206d.

Figure 8:
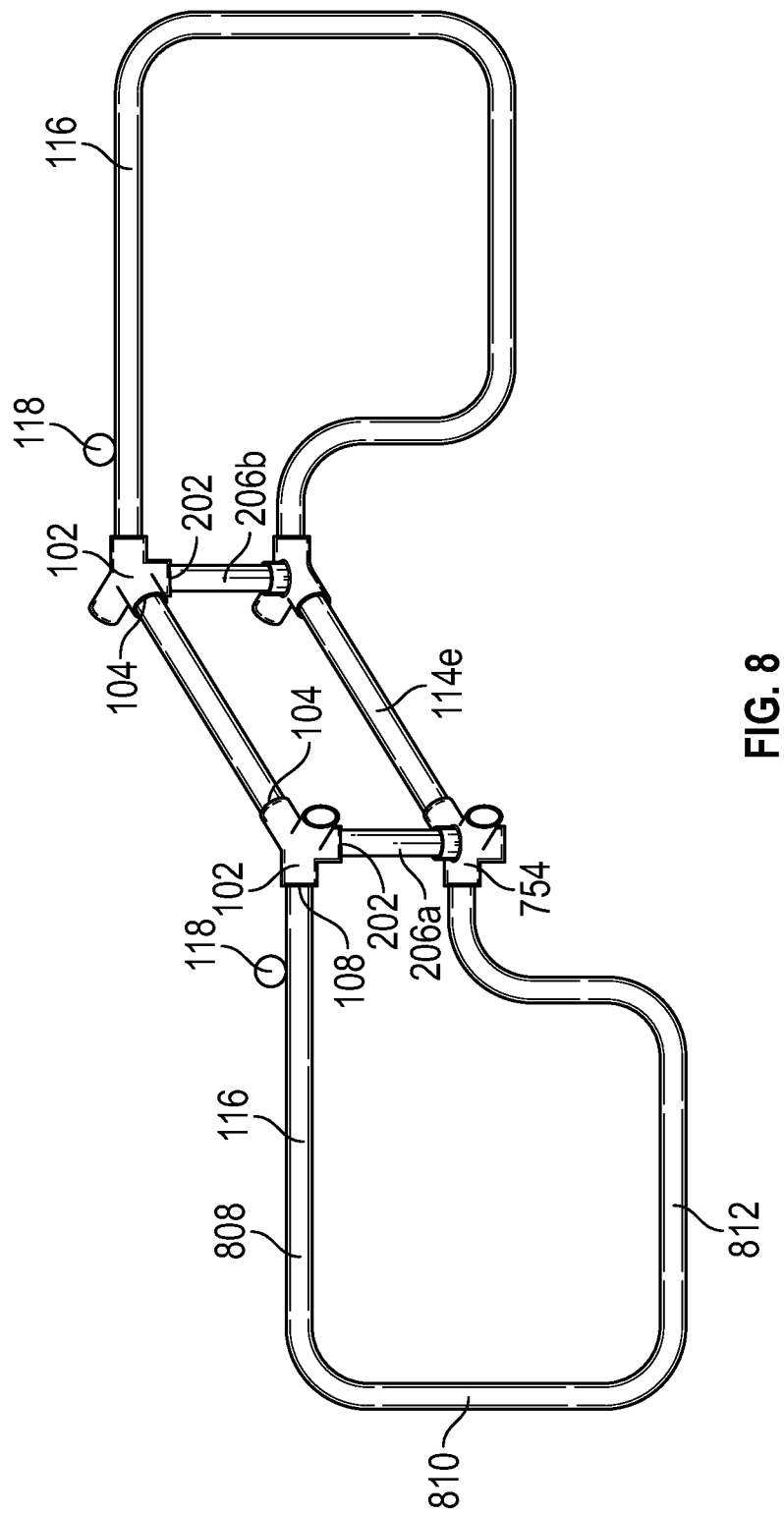
FIG. 8 illustrates a side view of an alternative construction the present disclosure.

As can be appreciated, stall dividers 116 are positioned to define each stall 152 and can be open or closed. Referring to FIG. 8, the stall dividers 116 may include an upper rail 808, a vertical end rail 810 and a lower rail 812.

Referring to FIG. 1, completing the close-packing livestock freestall assembly 100, the stall dividers 116 are further maintained in position with neck rails 118. Two neck rails 118 are provided, a first neck rail 118a and a second neck rail 118b. Each neck rail 118 may be a tubing of metal, plastic, or other durable material. The first neck rail 118a is attached to the first stall divider 116a adjacent the first connector body 102a and attached to the third stall divider 116c adjacent the third connector body 102c. The second neck rail 118b is attached to the second stall divider 116b adjacent the third connector body 102c and attached to the fourth stall divider 116d adjacent the fourth connector body 102d. The attachment may be by a coupling or by a pin, bolt or screw directly attaching the neck rail 118 to the stall divider 116.

Each connection may be permanent or may be detachably attachable so the components may be attached for assembly, detached when not in use or completely disassembled for storage or relocation.

When use is desired, the close-packing livestock stall assembly 100 may be assembled by affixing a connector body 102 to each of the plurality of upright members 206, affixing a first connector member 114a to the first connectors 104 of opposing connector bodies 102, affixing a second connector member 114b to the second connectors 106 of opposing connector bodies 102, affixing a third connector member 114c to the first connectors 104 of opposing connector bodies 102, affixing a fourth connector member 114d to the second connectors 106 of opposing connector bodies 102, affixing a stall divider 116 to each connector body 102 at the connector body third connector 108, affixing a first neck rail 118 to each stall divider 116 on a first side of the plurality of upright members 206 adjacent the first connector body 102a, and affixing a second neck rail 118 to each stall divider 116 on a second side of the plurality of upright members 206 adjacent the first connector body 102a.

Referring to FIGS. 1, 2, 4, 5, 6, 7 and 8, the close-packing livestock stall freestall assembly 100 may further include a first lower connector body 754a coupled to the first connector body 102a by the first upright member 206a, a second lower connector body 754b coupled to the second connector body 102b by the second upright member 206b, a third lower connector body 754c coupled to the third connector body 102c by a third lower upright member 206c, a fourth lower connector body 754c coupled to the fourth connector body 102d by a fourth upright member 206d, and a fourth connector member 114d, a fifth connector member 114e, and a sixth connector member 114f. The fourth connector member 114d is adapted for attachment to a first lower connector body 754a and to a second lower connector body 754cd. The fifth connector member 114e is adapted for attachment to the second lower connector body 754b and to a third lower connector body 754c. The sixth connector member 114f is adapted for attachment to the third lower connector body 754c and to a fourth lower connector body 754d. Each of the connector bodies 102 is constructed identically and each of the lower connector bodies 754 is constructed identically and the connector bodies 102 and each of the lower connector bodies 754 may be interchangeable. This identical construction and interchangeability within connector bodies 102 and within the lower connector bodies 754 permits easy erection and repair of the close-packing livestock freestall assembly 100.

When the lower connector bodies 754 are used, six connector members 114 provide two staggered, interlocking stalls 152. A first lower connector body 754a is coupled to the first connector body 102a by a first upright member 206a and a second lower connector body 754b is coupled to the second connector body 102b by a second upright member 206b. A third lower connector body 754c is coupled to the third connector body 102c by a third upright member 206c and a fourth lower connector body 754d is coupled to the fourth connector body 102d by a fourth upright member 206d. A fourth connector member 114d is adapted for attachment to a first lower connector body 754a and to the second lower connector body 754b, while a fifth connector member 114e is adapted for attachment to the second lower connector body 754b and to the third lower connector body 754c, and a sixth connector member 114f is adapted for attachment to the third lower connector body 754c and to the fourth lower connector body 754d.

The first upright member 206a is connected to the first lower connector body 754a at the lower connector body fourth connector 770 and at the lower connector body fifth connector 772. The second upright member 206b is connected to the third lower connector body 754c at the lower connector body fourth connector 770 and at the lower connector body fifth connector 772.

The four lower connector bodies 754 include a first lower connector body 754a, a second lower connector body 754b, a third lower connector body 754c and a fourth lower connector body 754d. Each of the four lower connector bodies 754 has a lower connector body first connector 704, a lower connector body second connector 766, a lower connector body third connector 768, a lower connector body fourth connector 770, and a lower connector body fifth connector 772. The lower connector body fourth connector 770 is downwardly directed while the lower connector body fifth connector 772 is upwardly directed and aligned with the lower connector body fourth connector 770. Each of the lower connector body first connector 704, the lower connector body second connector 766, and the lower connector body third connector 768 is perpendicular to the lower connector body fourth connector 770 and extends away from the lower connector body fourth connector 770. Each of the lower connector body connectors is aligned with the corresponding connector body connector.

When assembled, the first stall divider 116a is connected to the connector body third connector 108 of the first connector body 102a and to a lower connector body third connector 768 of the first lower connector body 754a. The second stall divider 116b is connected to the connector body third connector 108 of second connector body 102b and to a lower connector body third connector 768 of the second lower connector body 754b. The third stall divider 116c connected to the connector body third connector 108 of the third connector body 102c and to a lower connector body third connector 768 of the third lower connector body 754c. The fourth stall divider 116d connected to the connector body third connector 108 of the fourth connector body 102d and to a lower connector body third connector of the fourth lower connector body.

Once assembled, the freestall assembly 100 provides for closer packing of livestock than conventional systems, while providing a common centerline. With the zig-zag pattern of stalls 152, the number of stalls 152 and therefore the number of cattle is increased. The freestall assembly 100 thus, promotes better airflow and utilizes a smaller footprint without wasted space. Because the freestall assembly 100 is supported by the first vertical support 180a and the second vertical support 180b, structural changes are not required for installation. However, when desired, additional supports positioned solely for the freestall assembly 100 may be used and attached to the freestall assembly 100.

Referring to FIGS. 1, 2, 6, and 8, thus, construction of a close-packing livestock freestall assembly 100 is accomplished by providing a plurality of connector bodies 102 each of the connector bodies 102 having a connector body first connector 104, a connector body second connector 106, and a connector body third connector 108; providing a first upright member 206a, a second upright member 206b, a third upright member 206c, and a fourth upright member 206d; affixing one of the plurality of connector bodies to each of the first upright member 206a, the second upright member 206b, the third upright member 206c and the fourth upright member 206d; affixing a first connector member 114a to the first connectors 104 of opposing connector bodies 102; affixing a second connector member 114b to the second connectors 106 of opposing connector bodies 102; affixing a third connector member 114c to the first connectors 104 of opposing connector bodies 102; affixing a fourth connector member 114d to the second connectors 106 of opposing connector bodies 102; affixing a stall divider 116 to each connector body 102 at the connector body third connector 108; affixing a first neck rail 118a to each stall divider 116 on a first side of the first upright member 206a adjacent one of the plurality of first connector bodies 102; and affixing a second neck rail 118b to each stall divider 116 on a second side of the first upright member 206a adjacent one of the plurality of the first connector bodies 102.

Assembly of the close-packing livestock freestall assembly 100 may also include attaching a first of the first connector member 114a to a first vertical support 180a and attaching a second of the first connector member 114a to a second vertical support 180b.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A close-packing livestock freestall assembly, comprising:
   a plurality of stalls separated by a divider with a plurality of vertices of a vertex angle alternating in direction to provide a zig-zag pattern,
   each stall having a plurality of parallel stall dividers, wherein each stall divider is joined to a respective vertex opposite the respective vertex's vertex angle.

2. The close-packing livestock freestall assembly of claim 1, wherein the divider with a plurality of vertices comprises three connection members including a first connector member, a second connector member, and a third connector member,
   the first connector member adapted for attachment to a connector body first connector of a first connector body and to a connector body first connector of a second connector body,
   the second connector member adapted for attachment to a connector body second connector of the second connector body and to a connector body second connector of a third connector body,
   the third connector member adapted for attachment to a connector body first connector of the third connector body and to a connector body first connector of a fourth connector body; and
   wherein the plurality of stall dividers comprises four stall dividers, the four stall dividers including a first stall divider, a second stall divider, a third stall divider and a fourth stall divider,
   the first stall divider adapted for connection to the connector body third connector of the first connector body,
   the second stall divider adapted for connection to the connector body third connector of the second connector body,
   the third stall divider adapted for connection to the connector body third connector of the third connector body,
   the fourth stall divider adapted for connection to the connector body third connector of the fourth connector body; and
   two neck rails, the two neck rails including a first neck rail and a second neck rail,
   the first neck rail adapted for attachment to the first stall divider adjacent the first connector body and adapted for attachment to the third stall divider adjacent the third connector body, and the second neck rail adapted for attachment to the second stall divider adjacent the third connector body and adapted for attachment to the fourth stall divider adjacent the fourth connector body.

3. The close-packing livestock freestall assembly of claim 2 wherein each of the three connector members includes a wide body positioned in one of the three locations consisting of a first location above a top surface of each connector member, a second location above and below the top surface of each connector member, and a third location below the top surface of each connector member.

4. The close-packing livestock freestall assembly of claim 3 wherein the wide body includes an open loop with a bar through the opening.

5. The close-packing livestock freestall assembly of claim 2, further comprising:
a first lower connector body coupled to the first connector body by a first upright member;
a second lower connector body coupled to the second connector body by a second upright member;
a third lower connector body coupled to the third connector body by a third upright member;
a fourth lower connector body coupled to the fourth connector body by a fourth upright member;
a fourth connector member adapted for attachment to a first lower connector body and to the second lower connector body;
a fifth connector member adapted for attachment to the second lower connector body and to the third lower connector body, and
a sixth connector member adapted for attachment to the third lower connector body and to the fourth lower connector body.

6. The close-packing livestock freestall assembly of claim 2, wherein the connector body first connector is positioned at a 120 degree angle to the connector body second connector, the connector body first connector is positioned at a 120 degree angle to the connector body third connector, and the connector body second connector is positioned at a 120 degree angle to the connector body third connector.

7. The close-packing livestock freestall assembly of claim 2,
wherein the connector body third connector is fixedly positioned to a connector body center member,
the connector body first connector being pivotally affixed to the connector body center member and adapted to be fixed in one of a plurality of positions relative to the connector body center member at an angle greater than 90 degrees relative to the connector body third connector, and the connector body second connector being pivotally affixed to the connector body center member and adapted to be fixed in one of a plurality of positions relative to the connector body center member at an angle greater than 90 degrees relative to the connector body third connector.

8. The close-packing livestock freestall assembly of claim 7, further comprising:
a first lower connector body coupled to the first connector body by a first upright member;
a second lower connector body coupled to the second connector body by a second upright member;
a third lower connector body coupled to the third connector body by a third upright member;
a fourth lower connector body coupled to the fourth connector body by a fourth upright member;
a fourth connector member adapted for attachment to a first lower connector body and to the second lower connector body;
a fifth connector member adapted for attachment to the second lower connector body and to the third lower connector body, and
a sixth connector member adapted for attachment to the third lower connector body and to the fourth lower connector body;
each lower connector body having a lower connector body first connector, a lower connector body second connector, and a lower body connector third body,
the lower connector body third connector fixedly positioned to a lower connector body center member,
the lower connector body first connector pivotally affixed to the lower connector body center member and adapted to be fixed in one of a plurality of positions relative to the lower connector body center member at an angle greater than 90 degrees relative to the lower connector body third connector, and
the lower connector body second connector pivotally affixed to the lower connector body center member and adapted to be fixed in one of a plurality of positions relative to the lower connector body center member at an angle greater than 90 degrees relative to the lower connector body third connector.

9. The close-packing livestock freestall assembly of claim 7, further comprising:
a first connector second pin detachably affixed to the connector body center member and the connector body first connector;
a second connector second pin detachably affixed to the connector body center member and the connector body second connector;
and wherein
the connector body first connector being pivotally affixed to the connector body center member by first connector pivot pin; and
the connector body second connector being pivotally affixed to the connector body center member by second connector pivot pin.

10. The close-packing livestock freestall assembly of claim 2, wherein each of the four stall dividers include an upper rail, a vertical end rail and a lower rail, and the lower rail is coupled to the respective lower connector body.

* * * * *